(12) United States Patent
Krishna

(10) Patent No.: US 11,936,699 B2
(45) Date of Patent: Mar. 19, 2024

(54) OPTIMAL USAGE OF CONTENT STORAGE IN A MANAGED NETWORK

(71) Applicant: MICRO FOCUS LLC, Santa Clara, CA (US)

(72) Inventor: Vamsi Krishna, Bangalore (IN)

(73) Assignee: Micro Focus LLC, Santa Clara, CA (US)

( * ) Notice: Subject to any disclaimer, the term of this patent is extended or adjusted under 35 U.S.C. 154(b) by 0 days.

(21) Appl. No.: 17/832,365

(22) Filed: Jun. 3, 2022

(65) Prior Publication Data

US 2023/0396663 A1 Dec. 7, 2023

(51) Int. Cl.
G06F 15/16 (2006.01)
H04L 41/0677 (2022.01)
H04L 65/61 (2022.01)
H04L 65/75 (2022.01)

(52) U.S. Cl.
CPC .......... H04L 65/61 (2022.05); H04L 41/0677 (2013.01); H04L 65/764 (2022.05)

(58) Field of Classification Search
CPC .... H04L 65/61; H04L 65/764; H04L 41/0677
USPC ................................. 709/203, 219
See application file for complete search history.

(56) References Cited

U.S. PATENT DOCUMENTS

| | | | |
|---|---|---|---|
| 8,832,295 B2 | 9/2014 | Zuckerman | |
| 8,903,973 B1 * | 12/2014 | Hindawi | G06F 16/27 709/217 |
| 8,966,097 B1 * | 2/2015 | Roseman | H04N 21/4331 709/227 |
| 9,047,310 B2 | 6/2015 | Li | |
| 11,356,120 B1 * | 6/2022 | Markle | G06F 11/1076 |
| 2006/0069800 A1 * | 3/2006 | Li | H04L 65/612 707/E17.032 |
| 2017/0048021 A1 | 2/2017 | Yanovsky | |
| 2017/0346887 A1 * | 11/2017 | Kaguma | H04L 67/1093 |
| 2019/0014161 A1 * | 1/2019 | Doar | H04L 67/06 |
| 2021/0096952 A1 * | 4/2021 | Ali | G06F 3/0689 |
| 2021/0334184 A1 * | 10/2021 | Menon | H03M 13/1515 |

OTHER PUBLICATIONS

Brian Beach; Backblaze Open-sources Reed-Solomon Erasure Coding Source Code;https://www.backblaze.com/blog/reed-solomon/; Jun. 16, 2015; 11 pages.
Khemani, PHD.; Erasure Coding for the Masses; https://towardsdatascience.com/erasure-coding-for-the-masses-2c23c74bf87e; Published in Towards Data Scient; Dec. 21, 2020; 22 pages.

* cited by examiner

Primary Examiner — Duyen M Doan
(74) Attorney, Agent, or Firm — Sheridan Ross P.C.

(57) ABSTRACT

An event is identified. The event is associated with device content (e.g., one or more files) and a network location (e.g., a branch location of a corporation). One or more rules are retrieved. The one or more rules are associated with the device content, the network location, and a number of communication devices at the network location. A number of shards (e.g., erasure encoding shards) are determined based on the rules. The number of shards are generated. The number of shards are sent to a plurality of communication devices at the network location according to the rules. The plurality of communication devices at the network location are equal to or less than the number of communication devices at the network location.

20 Claims, 4 Drawing Sheets

OPTIMAL USAGE OF CONTENT STORAGE IN A MANAGED NETWORK

FIELD

The disclosure relates to network management systems and particularly to network management systems that provide enhanced file downloading.

BACKGROUND

With the number of communication devices dramatically increasing nowadays, the ability to manage a large computer network is becoming increasingly difficult. In addition, the types of devices being managed may include mobile devices, limited memory devices (e.g., embedded devices/sensors), along with traditional devices such as, personal computers and servers. Pushing a large amount of new content (e.g., a computer update) to a large number of devices may have issues, such as, bandwidth problems and storage issues.

SUMMARY

These and other needs are addressed by the various embodiments and configurations of the present disclosure. The present disclosure can provide a number of advantages depending on the particular configuration. These and other advantages will be apparent from the disclosure contained herein.

An event is identified. The event is associated with device content (e.g., one or more files) and a network location (e.g., a branch location of a corporation). One or more rules are retrieved. The one or more rules are associated with the device content, the network location, and a number of communication devices at the network location. A number of shards (e.g., erasure encoding shards) are determined based on the rules. The number of shards are generated. The number of shards are sent to a plurality of communication devices at the network location according to the rules. The plurality of communication devices at the network location are equal to or less than the number of communication devices at the network location.

The phrases "at least one", "one or more", "or," and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate" and "compute," and variations thereof, as used herein, are used interchangeably, and include any type of methodology, process, mathematical operation, or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof Further, the structures, materials or acts and the equivalents thereof shall include all those described in the summary, brief description of the drawings, detailed description, abstract, and claims themselves.

As defined herein, the term "network location" may include a network, a corporate network, a branch location of a corporate network, a plurality of networks, a plurality of branch locations of a corporate network, and/or the like.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Figure 1:
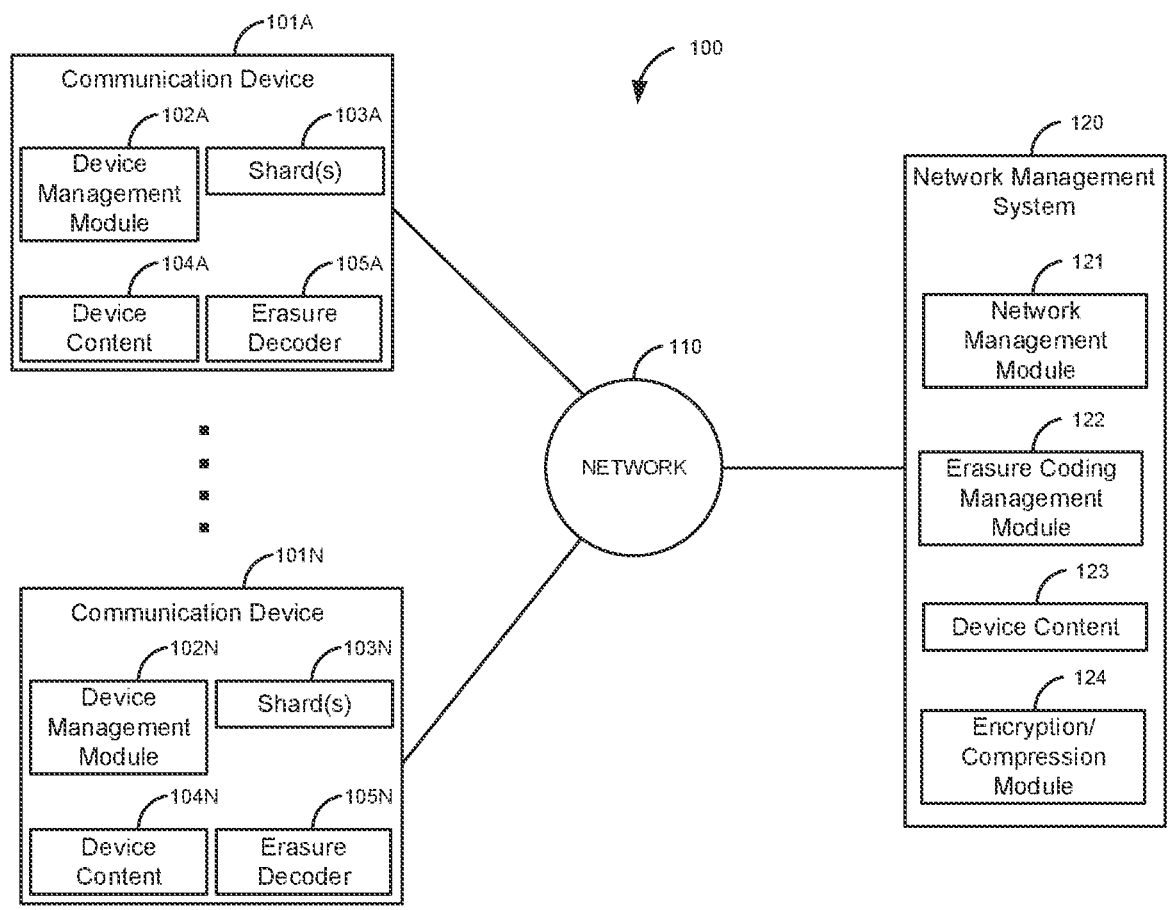
FIG. 1 is a block diagram of a first illustrative system for optimal usage of device content in a managed network.

FIG. 1 is a block diagram of a first illustrative system 100 for optimal usage of device content 104/123 in a managed network 110. The first illustrative system 100 comprises communication devices 101A-101N, a network 110, and a network management system 120.

The communication devices 101A-101N can be or may include any communication device 101 that can communicate on the network 110, such as a Personal Computer (PC), a telephone, a video system, a cellular telephone, a Personal Digital Assistant (PDA), a tablet device, a notebook device, a web server, a media server, a smartphone, a sensor, a printer, an embedded device, a medical device, and/or the like. Any number of communication devices 101A-101N may be connected to the network 110.

The communication devices 101A-101N further comprise device management modules 102A-102N, shards 103A-103N, device content 104A-104N, and erasure decoders 105A-105N. The device management modules 102A-102N manage the delivery of the device content 104A-104N from the network management system 120. The device management modules 102A-102N may manage encryption/compression if used.

The shards 103A-103N are erasure encoding shards 103 (fragments) that are generated by the erasure coding management module 122 and sent to the communication devices 101A-101N. The shards 103A-103N are generated based on the erasure coding algorithm (e.g., see https://en.wikipedia.org/wiki/Erasure_code#.~.text=In%20coding%20theory%2C%20an%20erasure, subset%20of%20the%20n%20symbols, which is incorporated herein by reference). Although FIG. 1 shows the communication devices 101A-101N each having one or more shards 103A-103N, some of the communication devices 101A-101N may not have any shards 103. For example, some of the communication devices may have limited disk space/processing power.

The device content 104A-104N can be or may include any type of content that can be downloaded to the communication devices 101A-101N. For example, the device content 104A-104N may be files, software patches, software applications, device images, databases, media files, computer programs, firmware updates, and/or the like. The device content 104A-104N may be regenerated from the shards 103A-103N by the erasure decoders 105A-105N.

The erasure decoders 105A-105N are used to regenerate the device content 104A-104N from the shards 103A-103N. The erasure decoders 105A-105N use the erasure encoding algorithm.

The network 110 can be or may include any collection of communication equipment that can send and receive electronic communications, such as the Internet, a Wide Area Network (WAN), a Local Area Network (LAN), a packet switched network, a circuit switched network, a cellular network, a combination of these, and the like. The network 110 can use a variety of electronic protocols, such as Ethernet, Internet Protocol (IP), Hyper Text Transfer Protocol (HTTP), Web Real-Time Protocol (Web RTC), and/or the like. Thus, the network 110 is an electronic communication network configured to carry messages via packets and/or circuit switched communications.

The network management system 120 can be any hardware coupled with hardware than can manage the communication devices 101A-101N via the network 110. The network management system 120 manages the communication devices 101A-101N by generating and sending the shards 103A-103N to the communication devices 101A-101N. The network management system 120 comprises a network management module 121, an erasure coding management module 122, device content 123, and an encryption/compression module 124.

The network management module 121 can be or may include any hardware coupled with software that is used to manage the communication devices 101A-101N. The network management module 121 can manage individual communication devices 101, groups of communication devices 101 (e.g., at a branch location), and/or all the communication devices 101A-101N.

The erasure coding management module 122 uses the erasure coding algorithm to create the shards 103A-103N from the device content 123 to be distributed among the communication devices 101A-101N. The erasure coding management module 122 uses erasure coding [N, K], where the device content 123 can be broken down into N smaller shards 103 (N>=1) where each shard 103 is of size 1/N of the original device content 123 (e.g., a file 123). In order to reconstruct the original device content 123, any K shards 103 out of N is sufficient. For example, to understand the use of shards 103, suppose there is a file 123 that is ten megabytes in size on the network management system 120 that is to be downloaded to the communication devices 101A-101N; here a portion of the shards 103 are downloaded to each communication device 101A-101N. If a [10,4] erasure coding scheme is used, the file 123 will be split into fourteen (10+4) shards 103 each one megabyte in size where any 10 of the 14 shards are sufficient to reconstruct the original file 123.

The number of shards 103 (K) may vary based on implementation. For example, the number of shards 103 may be larger based on the size of the device content 104/123, the number of communication devices 101A-101N, a storage capability of the communication devices 101A-101N, and/or the like.

The shards 103A-103N are then distributed to the communication devices 101A-101N by the network management module 121. In one embodiment, the shards 103A-103N may be evenly distributed among the communication devices 101A-101N in buckets (a bucket for each communication device 101A-101N). For example, if there were five communication devices 101A-101N and fourteen shards 103A-103N, four of the communication devices 101A-101N would receive three different shards 103 and one of the communication devices 101 would have two different shards 103 (fourteen total). The process of shard 103 distribution may vary based on implementation. For example, the shards 103A-103N may be distributed based on storage capability of a communication devices 101, an availability of a communication device (i.e., how often is the communication device 101 on), a processing power of the communication device 101, and/or the like.

The device content 123 can be any type of device content 123, such as, files, patches, image data, software applications, firmware, firmware patches, media files, and/or the like. The device content 123 is sharded into the shards 103A-103N and downloaded to the communication devices 101A-101N to regenerate the device content 104 (the same file) using the erasure coding algorithm.

The encryption/compression module 124 is used to encrypt/compress the device content 123 before the sharding process is performed. The process of encryption and/or compression may or may not be used in the processes described herein.

Figure 2:
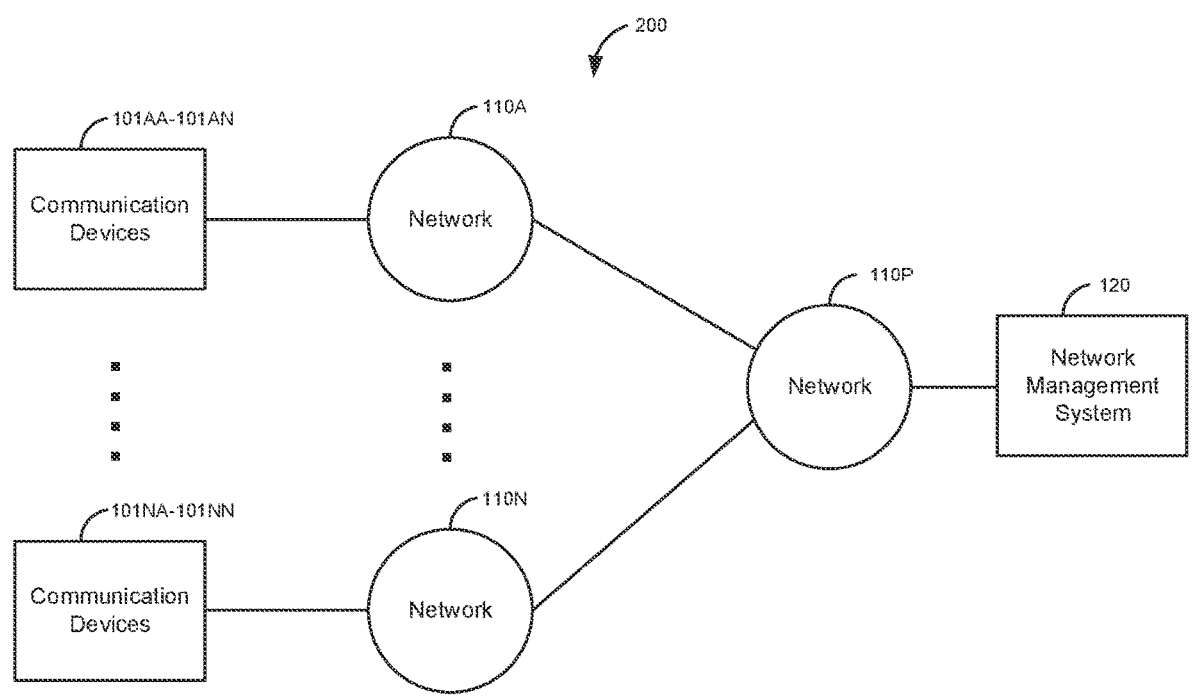
FIG. 2 is a block diagram of a second illustrative system for optimal usage of device content in a plurality of managed networks.

FIG. 2 is a block diagram of a second illustrative system 200 for optimal usage of device content 104/123 in a plurality of managed networks 110A-110N. The second illustrative system 200 comprises communication devices 101AA-101AN/101NA-101NN, networks 110A-110N, network 110P, and the network management system 120.

In FIG. 2, the network management system 120 manages multiple communication devices 101AA-101AN/101NA-101NN that are on multiple networks 110A-110N. For example, the network 110P may be a central corporate network and the networks 110A-110N are networks at branch locations of the corporation. Alternatively, the network 110P may be the Internet and the networks 110A-110N may be private networks of different corporations (e.g., management as a service).

In FIG. 2, the sharding process may occur at a network 110/location level. For example, the shards 103/device content 104 downloaded to the communication devices 101AA-101AN may be different shards 103/device content 104 than the shards 103/device content 104 downloaded to the communication devices 101NA-101NN. In addition, the number of shards 103 downloaded to the communication devices 101AA-101AN may be different than the number of shards 103 downloaded to the communication devices 101NA-101NN for the same device content 104. For example, the number/types/capability of communication devices 101 may be different on each network 110A-110N and thus the distribution of the shards 103 likely will be different.

Figure 3:
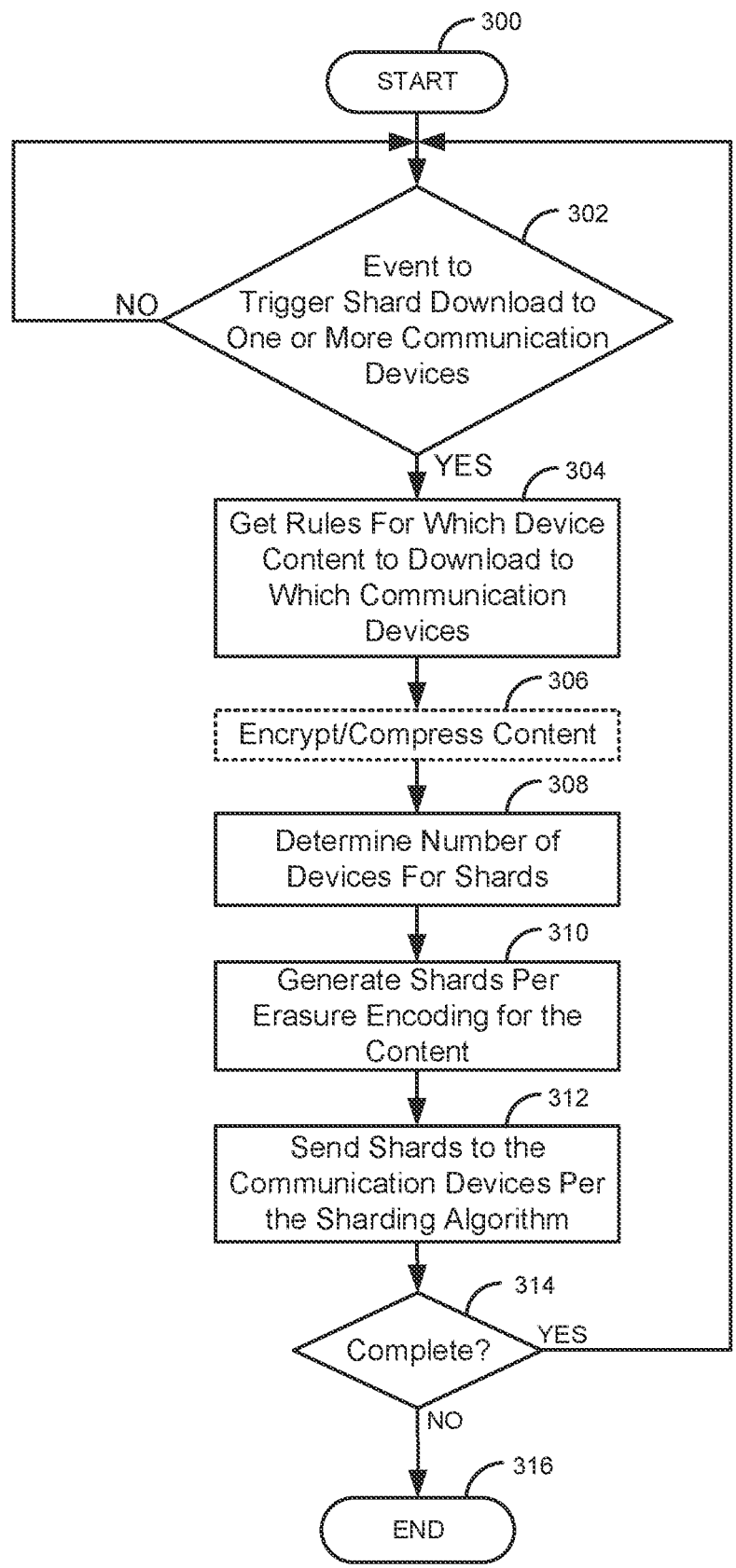
FIG. 3 is a flow diagram of a process for optimizing the delivery of device content in a managed network.
Figure 4:
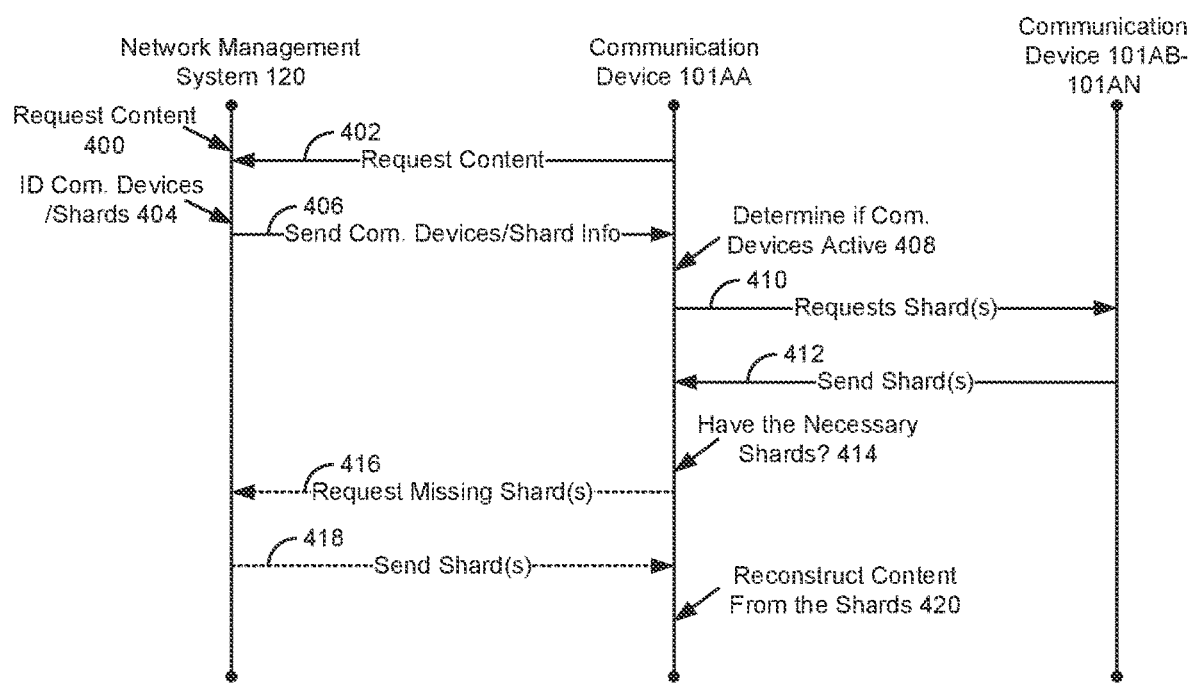
FIG. 4 is a flow diagram of a process for identifying where shards of device content are located in a network.

FIG. 3 is a flow diagram of a process for optimizing the delivery of device content 104/123 in a managed network 110. Illustratively, the communication devices 101A-101N, the device management modules 102A-102N, the erasure decoders 105A-105N, the network management system 120, the network management module 121, the erasure coding management module 122, the encryption/compression module 124, the communication devices 101AA-101AN, and the communication devices 101NA-101NN are stored-program-controlled entities, such as a computer or microprocessor, which performs the method of FIGS. 3-4 and the processes described herein by executing program instructions stored in a computer readable storage medium, such as a memory (i.e., a computer memory, a hard disk, and/or the like). Although the methods described in FIGS. 3-4 are shown in a specific order, one of skill in the art would recognize that the steps in FIGS. 3-4 may be implemented in different orders and/or be implemented in a multi-threaded environment. Moreover, various steps may be omitted or added based on implementation.

The process starts in step 300. The network management module 121 waits to identify, in step 302, for an event to trigger downloading shards 103 of the device content 123 to one or more communication devices 101A-101N. For example, the event may be for a software patch to be downloaded, for an application to be downloaded, for one or more files to be downloaded, to upgrade an application, to install new firmware, and/or the like. The device content 123 may be targeted for a single communication device 101, for a group of communication device 101AN-101NN, for a group of communication devices 101A-101N at a location, for a specific type of communication device 101 (e.g., all Dell® laptop computers of type X), and/or the like. The event of step 302 may be an administered event, an event generated by the communication device 101, a periodic event, and/or the like. If an event is not received in step 302, the process of step 302 repeats.

Otherwise, if an event is detected in step 302, the network management module 121 gets the rules for which device content 104 to download to which communication devices 101 in step 304. For example, the rule may be to download patch X for application Y to all Windows® desktops at location Y (e.g., network 110N) at midnight on May 11, 2022.

The encryption/compression module 124, in step 306, compresses/encrypts the device content 123 (e.g., the patch). Step 306 may be optional based on implementation.

The erasure coding management module 122 determines, in step 308, the number of shards 103 based on the rules. The erasure coding management module 122 generates the shards 103 based on the rules (e.g., the device content 123, the number of communication devices 101 at a location, a communication device capability, etc.) in step 310. For example, if there are 20 communication devices 101AA-101AN on the network 110A and the patch (device content 123) comprises two files: 1) file A that is 10 megabytes and 2) file B that is 20 megabytes. The erasure coding management module 122 determines that file A will be sharded into 14 shards 103 one megabyte in size and the file B will be sharded into 28 shards 103 also one megabyte in size. Although in this example, the size of the shards 103 for both file A and file B are the same, in some embodiments, the size of the shards 103 for both file A and file B may be different. For file A, the erasure coding management module 122 identifies 14 of the 20 communication devices 101AA-101AN to download an individual shard 103 of the 14 shards 103A-103N. For file B, the erasure coding management module 122 and identifies 12 of the communication devices 101AA-101AN that will get 1 shard 103 of the 28 shards 103 and 8 of the communication devices 101AA-101AN that will get a second shard of the 28 shards 103 (a bucket process).

The network management module 121 sends, in step 312, the shards 103 to the communication devices 101AA-101AN based on the sharding process of steps 308/310. The network management module 121 determines, in step 314, if the process is complete. If the process is not complete, the process goes back to step 302. Otherwise, if the process is complete in step 314, the process ends in step 316.

FIG. 4 is a flow diagram of a process for identifying where shards 103 of device content 104 are located in a network 110. The process starts in step 400/402 where the network management system 120 gets a request to send the device content 104 in either step 400 (generated on the network management system 120) or step 402 (from the communication device 101A). The request identifies the communication device 101AA. In response to the request to send device content 104 of step 400 or 402), the network management system 120 identifies, in step 404, the communication devices 101AA-101AN that have the shards 103 necessary to reconstruct the device content 104. The network management system 120 sends, in step 406, addresses for the communication devices 101AA-101AN with the shards 103. For example, if the request is for the patch described above where there are 14/28 shards 103 to the two files A/B, the message of step 406 will include a list of the addresses (e.g., IP addresses) of the 20 communication devices 101AA-101AN and a list of what shards 103 each communication device 101AA-101AN has received.

The communication device 101AA may also have one or more of the shards 103. The communication device 101AA determines, in step 408, which of the communication devices 101AB-101AN are active (e.g., are turned on). For example, the communication device 101AA may ping the communication devices 101AB-101AN to see if they are active. The communication device 101AA sends a request to the communication devices 101AB-101AN to get the shards 103AB-103AN in step 410. For example, if there were 14 shards 103 and it only takes 10 shards 103 to reconstruct file A, the communication device 101AA may only request 10 shards 103 for 10 of the 14 communication devices 101AB-101AN that have the shards 103 to reconstruct file A (assuming all the communication devices 101AB-101AN are active).

The communication devices 101AB-101AN send the shards 103 in step 412. The communication device 101AA determines, in step 414, if it has the necessary number of shards 103. If the communication device 101AA does not have the necessary number of shards 103 in step 414, the communication device 101AA requests the missing shard(s) 103 from the network management system 120 in step 416. The missing shards 103 may only be the minimum number of shards 103 to reconstruct the device content 104. The network management system 120 sends the shards 103 in step 418. The communication device 101AA reconstructs the device content 104A from the shards 103 in step 420.

The process of FIG. 4 can be repeated by the other communication devices (e.g., communication devices 101AB-101AN). For example, if there are 100 communication devices 101AA-101AN on the network 110A that need a patch 123, once the shards 103A-103N are downloaded, each of the remaining 99 communication devices 101AB-101AN can get the shards 103A-103N locally on the network 110A to reconstruct the patch 123. This dramatically reduces the amount of data that will need to be downloaded from the network management system 120.

In addition, if a file 123 becomes corrupted, the communication device 101AA may get the shards 103A-103N locally on the network 110A instead of downloading the file 123 from the network management system 120. For example, the communication device 101AA may request the list (because it may have changed) again and repeat the reconstruction process by getting the shards 103A-103N locally rather than downloading the file 123 from the network management system 120. Another advantage of this process is that that each of the communication devices 101AA-101AN does not have to retain any patch data (e.g., a backup copy) in anticipation of a future repair case. Instead, each communication device 101AA-101AN only retains a few shards 103 for a future repair situation. This reduces the overall disk space consumed per communication device 101.

Examples of the processors as described herein may include, but are not limited to, at least one of Qualcomm® Snapdragon® 800 and 801. Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, sub combinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system comprising:
   a microprocessor; and
   a non-transitory computer readable medium, coupled with the microprocessor and comprising microprocessor readable and executable instructions that, when executed by the microprocessor, cause the microprocessor to:
   identify an event, wherein the identified event is associated with device content and a network location;
   retrieve one or more rules, wherein the retrieved one or more rules are associated with the device content, the network location, and a number of communication devices at the network location;

determine a number of shards based on the one or more rules, wherein each shard of the determined number of shards comprises an erasure encoding shard;

generate the determined number of shards;

send the generated number of shards to a plurality of communication devices at the network location according to the retrieved one or more rules, wherein the plurality of communication devices at the network location are equal to or less than the number of communication devices at the network location;

receive a request for the device content, wherein the received request for the device content identifies a first communication device of the number of communication devices at the network location; and send a list of the plurality of communication devices to the identified first communication device, wherein the sent list of the plurality of communication devices identifies the number of generated shards on the plurality of communication devices at the network location; and wherein the identified first communication device uses the list of the plurality of communication devices to determine a minimum number of the plurality of communication devices to get a minimum number of shards of the generated number of shards to reconstruct the device content on the identified first communication device.

2. The system of claim 1, wherein the reconstructed device content becomes corrupted and wherein the first communication device requests the list of the plurality of communication devices in order to reconstruct the device content a second time.

3. The system of claim 1, wherein the list of the plurality of communication devices is sent to a second communication device of the number of communication devices and wherein the second communication device uses the list of the plurality of communication devices to determine the minimum number of the plurality of communication devices to get the minimum number of shards of the number of shards to reconstruct the device content on the second communication device.

4. The system of claim 1, wherein the list of the plurality of communication devices comprises a number of non-active communication devices at the network location, wherein the number of non-active communication devices at the network location prevents the first communication device from getting a minimum number of shards of the number of shards to reconstruct the device content, and wherein the first communication device requests one or more additional missing shards from a network management system in order to reconstruct the device content.

5. The system of claim 1, wherein the number of communication devices at the network location and/or the plurality of communication devices at the network location are determined based on one or more of: a storage capability, an availability, a processing power, and a bucket algorithm.

6. The system of claim 1, wherein the device content comprises a plurality of files, wherein the instructions to determine the number of shards based on the one or more rules comprise instructions to generate an individual set of shards for each of the plurality of files.

7. A method comprising:

identifying, by a microprocessor, an event, wherein the identified event is associated with device content and a network location;

retrieving, by the microprocessor, one or more rules, wherein the retrieved one or more rules are associated with the device content, the network location, and a number of communication devices at the network location;

determining, by the microprocessor, a number of shards based on the one or more rules, wherein each shard of the determined number of shards comprises an erasure encoding shard;

generating, by the microprocessor, the determined number of shards;

sending, by the microprocessor, the generated number of shards to a plurality of communication devices at the network location according to the retrieved one or more rules, wherein the plurality of communication devices at the network location are equal to or less than the number of communication devices at the network location;

receiving, by the microprocessor, a request for the device content, wherein the received request for the device content identifies a first communication device of the number of communication devices at the network location; and sending, by the microprocessor, a list of the plurality of communication devices to the identified first communication device, wherein the list of the plurality of communication devices identifies the generated number of shards on the plurality of communication devices at the network location; and wherein the identified first communication device uses the list of the plurality of communication devices to determine a minimum number of the plurality of communication devices to get a minimum number of shards of the generated number of shards to reconstruct the device content on the identified first communication device.

8. The method of claim 7, wherein the reconstructed device content becomes corrupted and wherein the first communication device requests the list of the plurality of communication devices in order to reconstruct the device content a second time.

9. The method of claim 7, wherein the list of the plurality of communication devices is sent to a second communication device of the number of communication devices and wherein the second communication device uses the list of the plurality of communication devices to determine the minimum number of the plurality of communication devices to get the minimum number of shards of the number of shards to reconstruct the device content on the second communication device.

10. The method of claim 7, wherein the list of the plurality of communication devices comprises a number of non-active communication devices at the network location, wherein the number of non-active communication devices at the network location prevents the first communication device from getting a minimum number of shards of the number of shards to reconstruct the device content, and wherein the first communication device requests one or more additional missing shards from a network management system in order to reconstruct the device content.

11. The method of claim 7, wherein the number of communication devices at the network location and/or the plurality of communication devices at the network location are determined based on one or more of: of a storage capability, an availability, a processing power, and a bucket algorithm.

12. The method of claim 7, wherein the device content comprises a plurality of files, wherein determining the number of shards based on the one or more rules comprises generating an individual set of shards for each of the plurality of files.

13. A non-transitory computer readable medium having stored thereon instructions that cause a processor to execute a method, the method comprising:
instructions to:
- identify an event, wherein the identified event is associated with device content and a network location;
- retrieve one or more rules, wherein the retrieved one or more rules are associated with the device content, the network location, and a number of communication devices at the network location;
- determine a number of shards based on the one or more rules, wherein each shard of the determined number of shards comprises an erasure encoding shard;
- generate the determined number of shards;
- send the generated number of shards to a plurality of communication devices at the network location according to the retrieved one or more rules, wherein the plurality of communication devices at the network location are equal to or less than the number of communication devices at the network location;
- receive a request for the device content, wherein the received request for the device content identifies a first communication device of the number of communication devices at the network location; and
- send a list of the plurality of communication devices to the identified first communication device, wherein the list of the plurality of communication devices identifies the generated number of shards on the plurality of communication devices at the network location; and
- wherein the identified first communication device uses the list of the plurality of communication devices to determine a minimum number of the plurality of communication devices to get a minimum number of shards of the generated number of shards to reconstruct the device content on the identified first communication device.

14. The non-transitory computer readable medium of claim 13, wherein the list of the plurality of communication devices comprises a number of non-active communication devices at the network location, wherein the number of non-active communication devices at the network location prevents the first communication device from getting a minimum number of shards of the number of shards to reconstruct the device content, and wherein the first communication device requests one or more additional missing shards from a network management system in order to reconstruct the device content.

15. The non-transitory computer readable medium of claim 13, wherein the device content comprises a plurality of files, and wherein determining the number of shards based on the one or more rules comprises generating an individual set of shards for each of the plurality of files.

16. The system of claim 1, wherein the network location comprises at least one of a network, a corporate network, a branch location of a corporate network, a plurality of networks, or a plurality of branch locations of a corporate network.

17. The method of claim 7, wherein the network location comprises at least one of a network, a corporate network, a branch location of a corporate network, a plurality of networks, or a plurality of branch locations of a corporate network.

18. The non-transitory computer readable medium of claim 13, wherein the network location comprises at least one of a network, a corporate network, a branch location of a corporate network, a plurality of networks, or a plurality of branch locations of a corporate network.

19. The system of claim 1, wherein the device content comprises at least one of a file, a software patch, a software application, a device image, a database, a media file, a computer program, or a firmware update.

20. The method of claim 7, wherein the device content comprises at least one of a file, a software patch, a software application, a device image, a database, a media file, a computer program, or a firmware update.

\* \* \* \* \*